US007861869B2

(12) United States Patent
Beckers et al.

(10) Patent No.: US 7,861,869 B2
(45) Date of Patent: Jan. 4, 2011

(54) REINFORCED CAPILLARY MEMBRANES AND PROCESS FOR MANUFACTURING THEREOF

(75) Inventors: Herman Beckers, Scherpenheuvel-Zichem (BE); Willy Doyen, Wommelgem (BE); Chris Dotremont, Kessel-Lo (BE)

(73) Assignee: Vlaamse Instelling Voor Technologisch Onderzoek (VITO), Mol (BE)

( * ) Notice: Subject to any disclaimer, the term of this patent is extended or adjusted under 35 U.S.C. 154(b) by 523 days.

(21) Appl. No.: 11/791,133

(22) PCT Filed: Nov. 18, 2005

(86) PCT No.: PCT/BE2005/000167

§ 371 (c)(1),
(2), (4) Date: May 21, 2008

(87) PCT Pub. No.: WO2006/053406

PCT Pub. Date: May 26, 2006

(65) Prior Publication Data

US 2008/0241451 A1    Oct. 2, 2008

(30) Foreign Application Priority Data

Nov. 19, 2004   (EP) ................................. 04447254

(51) Int. Cl.
*B01D 29/46* (2006.01)
*B01D 33/21* (2006.01)
*B01D 39/00* (2006.01)
*B29C 47/12* (2006.01)

(52) U.S. Cl. ............. 210/490; 210/400.23; 210/500.36; 210/500.41; 210/500.42; 427/247; 264/41; 264/176.1; 264/177.14; 428/376

(58) Field of Classification Search ................. 210/490, 210/500.36, 500.41, 500.27, 500.38, 500.3, 210/500.23, 500.42; 264/41, 45.81, 172.16, 264/171.26, 171.27; 427/247; 428/376
See application file for complete search history.

(56) References Cited

U.S. PATENT DOCUMENTS

| 3,676,193 | A  |   | 7/1972  | Cooper et al. |
|-----------|----|---|---------|---------------|
| 4,061,821 | A  |   | 12/1977 | Hayano et al. |
| 4,894,157 | A  | * | 1/1990  | Johnson ...................... 210/490 |
| 5,472,607 | A  | * | 12/1995 | Mailvaganam et al. ...... 210/490 |
| 6,354,444 | B1 |   | 3/2002  | Mahendran et al. |
| 7,172,075 | B1 | * | 2/2007  | Ji ............................... 210/490 |
| 7,267,872 | B2 | * | 9/2007  | Lee et al. ..................... 428/376 |

(Continued)

FOREIGN PATENT DOCUMENTS

DE        40 25 768 A1   2/1992

(Continued)

*Primary Examiner*—Ana M Fortuna
(74) *Attorney, Agent, or Firm*—Merchant & Gould P.C.

(57) ABSTRACT

A process for manufacturing asymmetric braid reinforced capillary ultra- or micro-filtration membranes (1), including the subsequent steps of pulling a tubular braid (5) through a spinneret (7) and coating the braid with a dope. Prior to the coating step, the braid is impregnated with a non-coagulation liquid, being a liquid which does not cause coagulation of the dope, when brought in contact with the dope. The result is a membrane with an outer skin, i.e. smaller pores near the outside diameter than near the inside diameter, and a coating which is closely arranged around the outside diameter of the braid, without any substantial penetration of the coating into the braid.

16 Claims, 2 Drawing Sheets

U.S. PATENT DOCUMENTS 7,413,804 B2 * 8/2008 Lee et al. .................... 428/376
7,562,778 B2 * 7/2009 Shinada et al. .............. 210/483

FOREIGN PATENT DOCUMENTS

| | | | |
|---|---|---|---|
| EP | 1 321 178 A2 | 6/2003 | |
| WO | 03/076055 A1 | 9/2003 | |
| WO | WO 03/097221 A1 | 11/2003 | |
| WO | WO 03009221 A1 * | 11/2003 | |
| WO | WO 03/047734 A1 * | 12/2003 | |

* cited by examiner

US 7,861,869 B2

REINFORCED CAPILLARY MEMBRANES AND PROCESS FOR MANUFACTURING THEREOF

This application is a 371 of PCT/BE05/00167 filed on Nov. 18, 2005, which claims priority of EP 04447254.6 filed on Nov. 19, 2004

FIELD OF THE INVENTION

The present invention is related to asymmetric capillary membranes which are longitudinally reinforced by an internal braid, and to a method of production thereof.

STATE OF THE ART

Semipermeable composite capillary membranes or reinforced semipermeable membranes are known. They are currently used as e.g. ultra- and micro-filtration membranes for membrane bioreactors (MBR) and particle filtration on liquids.

U.S. Pat. No. 3,676,193 describes a process for the manufacture of a tubular reinforced membrane. The braided material is completely embedded. The manufacturing process is done with a casting bob. Such a method is however not practical when producing capillary membranes.

U.S. Pat. No. 4,061,821 describes a semipermeable composite membrane consisting of a porous substance and a reinforcing material made of fibrous material embedded in the wall of the porous substance.

U.S. Pat. No. 5,472,607, "Hollow fiber semipermeable membrane of tubular braid" describes a hollow fiber membrane, comprising a tubular macroporous support (i.e. a braid) coated by a thin tubular asymmetric semipermeable film of polymer, on the outside of the membrane. The braid is so flexible that it does not have a circular cross-section and collapses with finger pressure. The voids of the braid are relatively much larger than the pores in the film but are small enough to inhibit substantial penetration of the dope (i.e. a solution comprising the polymer material of the coating). Coating is done by a unique nozzle design. The reinforcing material is partially filled with dope and the film thickness is between 0.01 and 0.1 mm. This partially filling up to maximum one third of the thickness is essential because the film would not withstand the pressure difference over the membrane without reinforcement.

During fabrication, one must prevent that dope is penetrating the braid too much and closes the inner hole of the braid. Hayano et al. (U.S. Pat. No. 4,061,821) solved this problem by using a special braid. In U.S. Pat. No. 5,472,607 it is stated that the voids of the braid must be small enough to inhibit substantial penetration of the polymer solution.

EP-A-1321178 describes a braid-reinforced hollow fiber membrane with an inner layer having a spongeous structure with micro pores having a diameter less than 10 µm. The penetration of the polymer film is preferably less than 30% of the reinforcing thickness.

WO-A-0397221A1 describes a hollow fiber membrane that is longitudinally reinforced by yarns, not by a braid. The central hole is formed by injecting an internal coagulation solution in the centre.

DE-A-4025768 describes a method to produce planar membranes. A porous structure that serves as permeate channel is at one side coated with dope. To prevent complete penetration of the dope and to have a better control of the penetration depth by the dope, the porous structure is first completely or partly filled with a liquid. Water is mentioned as the preferred choice for this liquid. Water is a coagulation liquid for the polymer solutions used in the dope, i.e. the polymer dope coagulates on contact with water, due to the fact that the solvents of the dope are miscible in water (the solvents are extracted from the dope and the result is a solidified polymer coating). A coagulation liquid is however not a desirable choice if one wants to obtain asymmetric membranes with a dense structure of small pores on the outside skin of the coating and larger pores on the inside, so-called 'outer skinned' membranes. The water in DE4025768 will have the effect of forming a double-skinned layer, with a dense structure in the vicinity of the porous support (because of the quick coagulation upon contact with the water present in the support), larger pores near the centre of the polymer coating, and again smaller pores near the outside surface (because of contact with water in the coagulation bath). The quick coagulation of the dope in the vicinity of the porous support ensures a good adhesion of the coating to the support, while preventing further penetration of the dope through the pores of the support. However, the result is a double-skinned layer, and it would not be possible to obtain an 'outer skinned' layer by using the same process (i.e. impregnating with water prior to applying the dope).

AIMS OF THE INVENTION

The present invention aims to provide a process for producing a semipermeable reinforced capillary membrane. The invention aims at solving the problem stated in the prior art of dope penetrating the braid too much, thereby closing the inner channel of the braid, in an alternative, cheap and easily implemented way, adapted to prepare the 'outer skinned' version of the membrane.

SUMMARY OF THE INVENTION

The invention is related to a process as described in the appended claims. According to the main claim, the present invention concerns a process for producing asymmetric braid reinforced capillary ultra- or micro-filtration membranes, in particular membranes of the 'outer skinned' type, comprising the subsequent steps of pulling a tubular braid through a spinneret and coating the braid with a dope comprising a polymer, characterised in that prior to said coating step, the braid is impregnated with a non-coagulation liquid, being a liquid which does not cause coagulation of said dope, when brought in contact with said dope. Said liquid should have a viscosity that is high enough that said liquid remains in the braid pores during the coating process, hence preventing the braid's pores and its internal channel from being filled up with membrane dope. For this purpose, the viscosity of the liquid preferably lies between 0.01 and 5 Pa·s. Excess of said non-coagulating viscous liquid may be wiped off from the outer surface of the braid in the spinneret itself prior to coating with dope.

According to a preferred embodiment, the inner channel formed by the tubular braid is completely filled up by the non-coagulation liquid, prior to coating. Preferably, the viscosity of the non-coagulation liquid is such that the liquid remains in the pores of the braid, and in the inner channel, during the process.

The effect of applying a non-coagulation liquid prior to the coating step, allows at the same time to prevent excessive penetration of the dope through the pores of the braid, and to obtain an 'outer-skinned' coating, without requiring a special braid or a special nozzle design on the spinneret. After being applied to the impregnated braid, the dope comes into contact with the non-coagulation liquid in the braid's pores. The dope will thus not immediately start to coagulate, but this process of coagulation will only start after the membrane is introduced into the coagulation water bath. Coagulation will thus start from the outside towards the inside, thereby forming the desired dense structure on the outside (small pores), and less dense structure on the inside (larger pores).

The use of a non-coagulation liquid is not self-evident on the basis of the available prior art. In the area of tubular membranes, it is not known to impregnate the braid with any liquid for the purpose of preventing dope penetration. Only in the area of flat membranes is it described to use water for this purpose (DE4025768). The use of a non-coagulation liquid on a flat membrane would immediately raise questions about the adhesion of the polymer to the porous support, which questions would also be applicable to tubular supports. It is proven further in the description that in the case of a tubular braid, coated according to the invention, the coating is arranged in close contact around the outside surface of the braid, without actually penetrating the braid. The contact is such that the inside surface of the coating closely follows the outside surface of the braid, including the twisted fibers of the braid, so that a sufficiently strong attachment of the coating to the braid is obtained.

The process of the present invention preferably further comprises the steps of a controlled vapour phase followed by coagulation of the dope in a hot water bath, preferably having a temperature in the range of 40° C. to 80° C., further washing out of solvent and water soluble additives and drying. Coagulation can also be done in a mixture of non-solvent and solvent instead of a water bath.

The internal non-coagulation liquid with arranged viscosity preferably is a solution of a solvent for the polymer comprised in the dope, and a viscosity increasing substance. Optionally one may add small amounts of non-solvent, below the relative amount of non-solvent which defines the point when coagulation occurs when the liquid comes in contact with the dope.

The viscosity increasing substance can comprise a water soluble polymer, such as polyvinyl pyrrolidone (PVP) or polyethylene glycol (PEG) and/or an inorganic hydrophilic salt such as LiCl.

The non-coagulation liquid may have a thixotropic viscosity behaviour. Due to this thixotropic behaviour, the viscous liquid has a high viscosity at low shear and low viscosity at high shear. The viscosity changes from 0.05 Pa·s at high shear to 1 Pa·s at high shear. The thixotropic behaviour is obtained by adding a further substance to a solvent for the polymer comprised in the dope, possibly in addition to the viscosity increasing substance mentioned above. This further substance is preferably a Theological additive for solvent based systems inducing thixotropy. Said substance creating thixotropy can be hydroxypropylcellulose (HPC), carboxymethylcellulose (CMC), organo-clays (bentonites), silicon or aluminium compounds (e.g. fumed silica, nanosized powders), polyamides siliconpolyether copolymer or liquid Theological additive for solvent-based system.

The dope used in the present invention is a viscous solution comprising a polymer resin, an organic solvent for the polymer being used, and a hydrophilic compound. Said organic solvent is preferably selected from the group consisting of N-methyl pyrrolidone, dimethyl formamide, dimethyl acetamide or a mixture thereof. Said polymer resin is advantageously selected from the group consisting of polysulphone, polyethersulfone, polyvinylidenedifluoride (PVDF), polyacronitrile, polyvinylchloride, polyimide, polyamideimide and polyesterimide. Said hydrophilic compound can be selected from the group consisting of polyethylene glycol (PEG), polyvinylpyrrolidone (PVP), glycerol or a mixture thereof.

The process according to the present invention can use braid material selected from the group consisting of polyamide 6/6, polyamide 12, polypropylene, polyethylene, aramid and polyester.

The scope of the invention includes an outer-skinned braid reinforced capillary ultra- or micro-filtration membrane obtained by the process according to the present invention. Such a braid is characterized by the close contact between the coating's inner surface and the braid's outer surface, without any substantial penetration of the coating into the braid.

SHORT DESCRIPTION OF THE DRAWINGS

FIGS. 1a and b respectively represent a cross section diagram and picture of the capillary membranes according to the present invention.

DETAILED DESCRIPTION OF THE INVENTION

The present invention relates to a process for making 'outer skinned' capillary membranes which are longitudinally reinforced by an internal braid. The invention is best explained with reference to the drawings.

Figure 1:
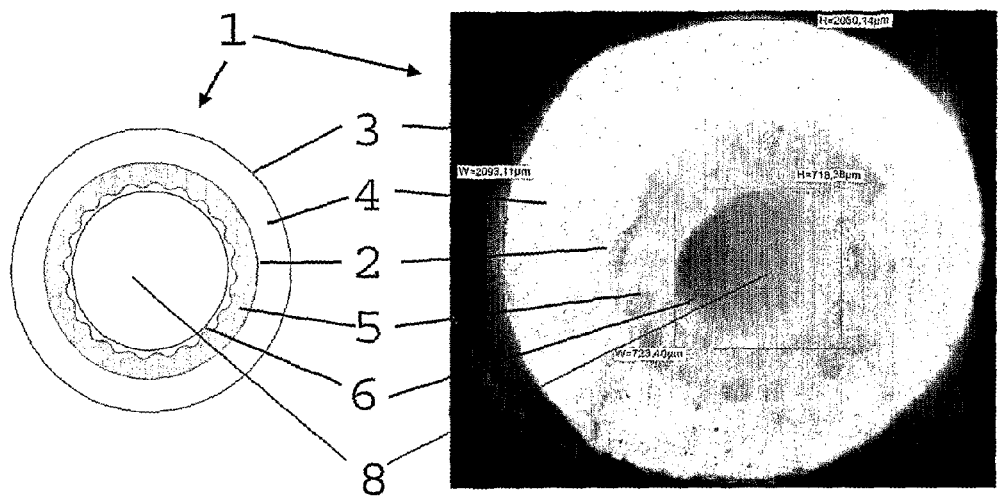

Referring to FIG. 1, a capillary reinforced membrane 1 is disclosed. The reinforced membrane 1 consists of a braid 5 on whose outer diameter 2 a coating layer 4 is coated during the spinning process. The reinforced membrane 1 has an internal diameter 6 which is the inner diameter of the braid and an external diameter 3 which is the outer diameter of the coating layer. The area 8 within the internal diameter 6 constitutes the inner channel of the braid.

Figure 2:
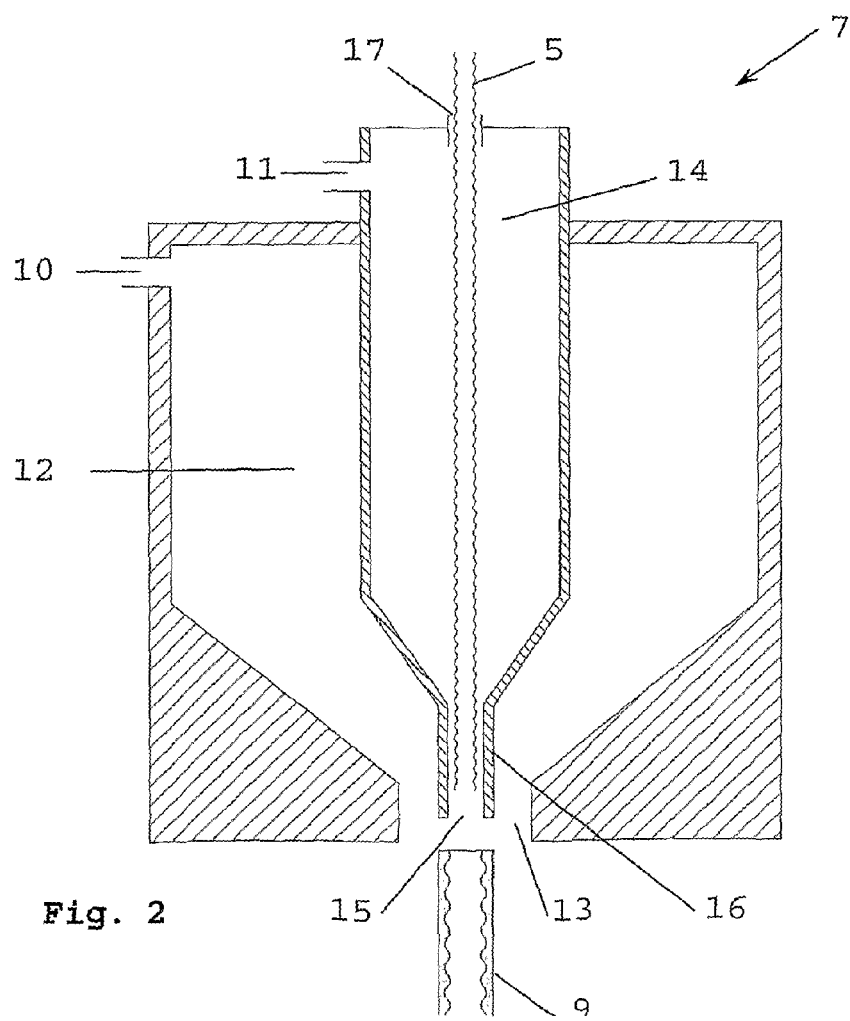
FIG. 2 represents schematically the cross-section in longitudinal direction of a spinneret which can be used to practice the present invention.

A spinneret such as shown in FIG. 2 is used to produce such a capillary membrane. The production steps are as follows:

a braid 5 is fed through the upper opening 17 of spinneret 7 into an interior chamber 14. The braid is a twisted hollow cord made out of for example polyester, polypropylene, polyethylene or polyamide with an outer diameter in the range of 0.5 to 5 mm.

in this chamber 14 the braid structure is impregnated and its internal channel 8 is completely filled up by a non-coagulation liquid. This liquid is fed through opening 11 by pressure difference or by means of a pump.

the dope is fed to the spinneret 7 through opening 10 into chamber 12 and is extruded through the outlet opening 13 of the spinneret.

the braid, completely filled up with non-coagulation liquid, leaves the spinneret through opening 15 of guiding tube 16 and is immediately coated by the extruded dope. This result is shown as 9. Preferably, the mouth portion of the inner chamber 14 has a diameter which corresponds to the outer diameter of the braid, so that the excess of non-coagulation liquid is scraped off the outside surface of the braid prior to the application of the dope, leaving the liquid only in the braid's pores and in the inner channel 8, after the controlled vapour phase, the braid with the dope at the outside and the non-coagulation liquid at the inside enter simultaneously into the water bath (or bath containing a mixture of solvent and non-solvent). Coagulation takes place solely from the outside (3) and goes gradually further inwards. No second skin is formed at the inner side because the inner liquid (inside the braid and its internal channel) with arranged viscosity is a non-coagulation liquid the further steps (removing of the solvent, etc.) are state-of-the-art in the making of asymmetric ultra- and micro-filtration membranes The non-coagulation liquid used for the filling up of the braid and its internal channel is a solvent for the polymers in the dope plus a substance to increase the viscosity, for instance polyvinylpyrrolidone (PVP) or polyethylene glycol (PEG). The amount of this substance is so chosen to have a viscosity that is low enough for easily filling of the braid and high enough to prevent that it leaves the braid during the coating. Optionally one may add small amounts of non-solvent, below the point when coagulation occurs when the liquid comes in contact with the dope. As described above, additives may be applied which give a thyxotropic behaviour to the non-coagulation liquid. When using such a non-coagulation liquid with arranged viscosity, the layer with smallest pores is found at the outer diameter (3) (skin at the outside) while the pores at the inner diameter (2) of the membrane are much larger, avoiding the formation of a second skin.

The process for making braid reinforced capillary membranes is much simpler with the present method. Further, there are no very stringent requirements to be put to the braid: the viscosity of the impregnating liquid can easily be adapted to the braid one uses.

Figure 3A:
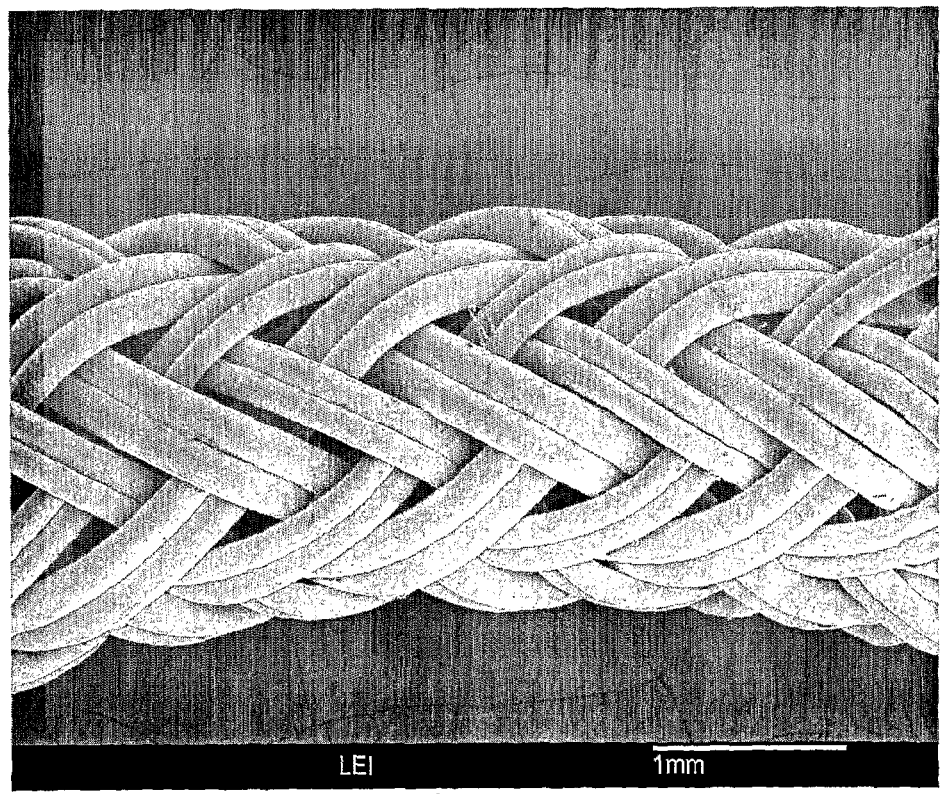
FIG. 3a represents a picture of a possible braid that can be used in the invention.
Figure 3B:
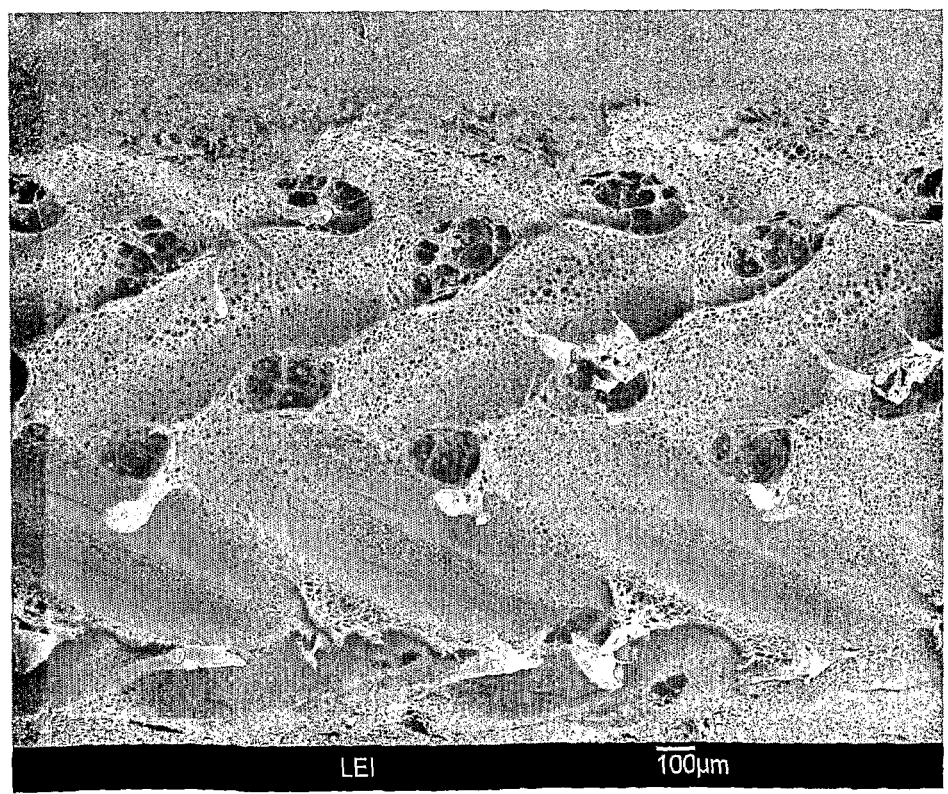
FIG. 3b represents the inside surface of the coating of a membrane produced according to the invention, in combination with the braid of FIG. 3a, after removing of the braid.

As mentioned above, questions might be raised about the adhesion of the polymer coating to the braid, when applying the method of the invention. Using a non-coagulation liquid of sufficient viscosity, it is possible to prevent any penetration of dope into the braid's pores, but this will also prevent the anchoring effect of the dope coagulating when it comes in contact with the liquid present in the pores. It has been observed however, that the coating as produced by the process of the invention, is nevertheless tightly arranged around the braid, forming virtually a negative of the braid's outside surface, as illustrated by the picture in FIGS. 3a and 3b. FIG. 3a shows an example of a braid while FIG. 3b shows a picture of the coating's inner surface (of a coating which has been applied to the braid of FIG. 3a), after the braid has been removed. The parallel lines made by the imprints of the braid's fibers are clearly visible on the inside of the coating. This proves that the close contact between the coating and the braid is such that the coating fills up every irregularity on the braid's outside surface, including the 'valleys' between two neighbouring fibres on said outside surface, without actually penetrating the braid. This ensures that the coating's connection to the braid is sufficiently strong, despite the fact that the coating is not actually anchored into the braid.

EXAMPLES

The diameters were measured with a microscope type Axioplan 2 from Zeiss. The pure water flux was measured on a small module containing only one membrane of about 10 cm length by putting water at a pressure of 1 bar on the module and by weighing the amount of water coming out of it during a fixed time. The mean pore size was determined with a capillary flow porometer from PMI, type CFP-1200-A. The other pore sizes were measured with a FESEM from Jeol, type JSM-6340F. The tensile strength was measured on an Instron type 1195.

Example 1

Reinforcing braid: made from polyamide 6/6, composed of 36 monofilaments of 110 dtex, inner diameter: 0.65 mm, outer diameter: 1.15 mm Dope composition: 20 wt.-% polyether sulphone (Radel A-100 from Solvay), 10 wt.-% polyvinylpyrrolidone ("PVP"; K90 from BASF) and 9 wt.-% glycerol dissolved in 61 wt.-% N-methyl pyrrolidone ("NMP")

Lumen liquid composition: 90 wt.-% NMP; 10 wt.-% PVP K90 supplied to the spinning head under a pressure of 0.2 bar. The viscosity at 20° C. is 0.2 Pa·s Spinning conditions:
coagulation liquid: water at 65° C.
air gap above liquid level: 8 cm
spinning speed: 7 m/min (condition A) and 11 m/min (condition B)
dope supply: 8.7 cm³/min Characterisation of Finished Product:

| Condition | A | B |
|---|---|---|
| Outer diameter (mm) | 1.9 | 1.7 |
| Pure water flux at 20° C. (l/h · m² · bar) | 6300 | 4500 |
| Mean pore size at outer skin (μm) | 0.15 μm | 0.12 μm |
| Pore size at inner diameter of coating (μm) | +/−20 μm | +/−20 μm |
| Tensile strength (N) | 100 | 112 |

The membrane was only superficially coated on the outer diameter of the reinforcing braid. The structure was asymmetric, with distinctive smallest pores at the outer diameter.

Comparative Example 1

With the same dope as in example 1 a capillary membrane was made without reinforcing braid. The outer and inner diameters were respectively 2.25 mm and 1.2 mm. The tensile strength was only 10.7 N.

Comparative Example 2

The same reinforced membrane was made as described in example 1 but without impregnating the reinforcement braid with lumen liquid. The central opening of the braid was completely filled with dope.

APPLICATIONS

The capillary membranes obtained with the method according to the present invention can be deployed as e.g. ultra- and micro-filtration membranes for membrane bioreactors (MBR) and for particle filtration on liquids.

The invention claimed is:
1. A process for manufacturing asymmetric braid reinforced capillary ultra- or micro-filtration membranes, comprising the subsequent steps of pulling a tubular braid of monofilament yarn through a spinneret and coating the braid with a dope, wherein prior to said coating step, the braid is impregnated with a non-coagulation liquid, being a liquid which does not cause coagulation of said dope, when brought in contact with said dope wherein the membranes have a pure water flux at 20 degree C. of at least 4500 l/h.M2.bars.

2. The process according to claim 1, wherein the viscosity of said non-coagulation liquid lies between 0.01 and 5 Pa.s.

3. The process according to claim 1, wherein the internal channel of said tubular braid is filled completely by said non-coagulation liquid.

4. The process of claim 1, further comprising the steps of a controlled vapour phase followed by coagulation of the dope in a water bath having a temperature in the range of 40° C. to 80° C., further washing out of solvent and water soluble additives and drying.

5. The process of claim 1, further comprising the steps of coagulation in a mixture of non-solvent and solvent, followed by washing and drying.

6. The process according to claim 1 wherein the non-coagulation liquid comprises a solvent and a substance which lends a thixotropic behaviour to the liquid.

7. The process according to claim 1 wherein the non-coagulation liquid is a solution of a solvent, a viscosity increasing substance, and optionally a non-solvent in a concentration below the point where coagulation of the dope starts.

8. The process of claim 7 wherein said viscosity increasing substance comprises a water soluble polymer.

9. The process of claim 8, wherein the water soluble polymer is one or more of: polyvinyl pyrrolidone (PVP) or polyethylene glycol (PEG) and an inorganic hydrophilic salt.

10. The process of claim 9, wherein the inorganic hydrophilic salt is LiCl.

11. The process as in claim 1, wherein the dope comprises organic solvent, polymer resin and hydrophilic compound.

12. The process as in claim 11, wherein said organic solvent is selected from the group consisting of N-methyl pyrrolidone, dimethyl formamide, dimethyl acetamide or a mixture thereof.

13. The process as in claim 11, wherein said polymer resin is selected from the group consisting of polysulphone, polyethersulfone, polyvinylidenedifluoride (PVDF), polyacronitrile, polyvinylchloride, polyimide, polyamideimide and polyesterimide.

14. The process as in claim 11, wherein said hydrophilic compound is selected from the group consisting of polyethylene glycol (PEG), polyvinylpyrrolidone (PVP), glycerol or a mixture thereof.

15. The process according to claim 1, wherein the braid material is selected from the group consisting of polyamide 6/6, polyamide 12, polypropylene, polyethylene, aramid and polyester.

16. A capillary membrane, produced according to the process of claim 1, comprising a tubular braid of monofilament yarn, and a polymer coating arranged around said braid, said coating having internal pores with a pore size that is smaller at the outside diameter of the coating and increases towards the inside diameter, characterized in that said coating is arranged in close contact with said braid, so that the inside surface of the coating follows every irregularity of the braid's outside surface, without any substantial penetration of said coating into said braid wherein the membrane have a pure water flux at 20 degree C. of at least 4500 l/h.M2.bars.

* * * * *